(12) United States Patent
Talty et al.

(10) Patent No.: US 7,956,797 B2
(45) Date of Patent: Jun. 7, 2011

(54) SYSTEM AND METHOD FOR MEASURING A RELATIVE DISTANCE BETWEEN VEHICLE COMPONENTS USING ULTRA-WIDEBAND TECHNIQUES

(75) Inventors: Timothy J. Talty, Beverly Hills, MI (US); Chandra S. Namuduri, Troy, MI (US); Yunjun Li, West Bloomfield, MI (US); Nancy McMahon, Rochester Hills, MI (US); Robert B. Elliott, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 12/400,112

(22) Filed: Mar. 9, 2009

(65) Prior Publication Data
US 2010/0225527 A1 Sep. 9, 2010

(51) Int. Cl.
*G01S 13/08* (2006.01)
*F03G 7/08* (2006.01)
*H02J 7/00* (2006.01)

(52) U.S. Cl. .......... 342/118; 342/125; 342/145; 342/85; 342/65; 342/70; 342/71; 342/72; 188/322.19; 290/1 R; 320/139

(58) Field of Classification Search .................. 342/118, 342/125, 145, 85, 65, 70–72; 188/322.19; 290/1 R; 320/139
See application file for complete search history.

(56) References Cited

U.S. PATENT DOCUMENTS

| 4,297,609 A | 10/1981 | Hirao et al. |
| 4,757,315 A | 7/1988 | Lichtenberg et al. |
| 4,817,922 A | 4/1989 | Hovance |
| 4,822,063 A | 4/1989 | Yopp et al. |
| 4,836,578 A | 6/1989 | Soltis |

(Continued)

FOREIGN PATENT DOCUMENTS

DE 39 09 190 C1 8/1990

(Continued)

OTHER PUBLICATIONS

Kim Sang-Dong; Jong-Hun Lee; , "Performance analysis of UWB radar for vehicle in multi-user environments," Advanced Communication Technology, 2008. ICACT 2008. 10th International Conference on , vol. 2, No., pp. 1036-1039, Feb. 17-20, 2008.*

(Continued)

*Primary Examiner* — John B Sotomayor
(74) *Attorney, Agent, or Firm* — Ingrassia Fisher & Lorenz, P.C.

(57) ABSTRACT

A system for measuring relative distance between a first component on a vehicle and a second component on the vehicle is provided. The system includes a wireless ultra-wideband (UWB) transceiver attached to the first component. The wireless UWB transceiver transmits a UWB measurement pulse toward the second component, and receives a reflected UWB pulse from a reflective surface of the second component. The reflected UWB pulse represents a reflected version of the UWB measurement pulse. The system also includes a processor coupled to the wireless UWB transceiver. The processor derives a relative distance between the first component and the second component, based upon characteristics of the UWB measurement pulse and the reflected UWB pulse. The system further includes a power generating system for the wireless UWB transceiver. The power generating system generates operating voltage for the wireless UWB transceiver from kinetic energy associated with motion of the first component relative to the second component.

20 Claims, 7 Drawing Sheets

U.S. PATENT DOCUMENTS

| | | | |
|---|---|---|---|
| 5,009,450 A | 4/1991 | Herberg et al. | |
| 5,218,308 A | 6/1993 | Bosebeck et al. | |
| 5,251,729 A | 10/1993 | Nehl et al. | |
| 5,267,466 A | 12/1993 | Morris | |
| 5,373,445 A | 12/1994 | Yopp | |
| 5,461,564 A | 10/1995 | Collins et al. | |
| 5,638,927 A | 6/1997 | Cheatham et al. | |
| 5,990,441 A | 11/1999 | Zaenglein et al. | |
| 6,069,581 A | 5/2000 | Bell et al. | |
| 6,209,691 B1 | 4/2001 | Fehring et al. | |
| 6,427,812 B2 | 8/2002 | Crawley et al. | |
| 7,420,462 B2 | 9/2008 | Nordmeyer | |
| 7,733,239 B2 | 6/2010 | Nordmeyer | |
| 7,777,396 B2 | 8/2010 | Rastegar et al. | |
| 2006/0186586 A1 | 8/2006 | Soles et al. | |
| 2006/0271678 A1* | 11/2006 | Jessup et al. | 709/224 |
| 2007/0205881 A1 | 9/2007 | Breed | |
| 2007/0251776 A1 | 11/2007 | Braun | |
| 2008/0116849 A1* | 5/2008 | Johnston | 320/114 |
| 2008/0252174 A1 | 10/2008 | Mohammadi et al. | |
| 2009/0021720 A1 | 1/2009 | Hecker | |
| 2009/0045698 A1 | 2/2009 | Genis et al. | |
| 2010/0052475 A1 | 3/2010 | Lee | |
| 2010/0094503 A1 | 4/2010 | Li et al. | |
| 2010/0123568 A1 | 5/2010 | Namuduri et al. | |
| 2010/0125389 A1* | 5/2010 | Talty et al. | 701/37 |
| 2010/0219641 A1 | 9/2010 | Namuduri et al. | |
| 2010/0219720 A1 | 9/2010 | Namuduri et al. | |
| 2010/0219721 A1 | 9/2010 | Namuduri et al. | |
| 2010/0219798 A1 | 9/2010 | Namuduri et al. | |
| 2010/0225527 A1* | 9/2010 | Talty et al. | 342/145 |

FOREIGN PATENT DOCUMENTS

| | | |
|---|---|---|
| DE | 41 12 276 C2 | 11/1992 |
| DE | 10 2005 008 403 A1 | 9/2006 |
| FR | 2594755 A3 | 8/1987 |
| JP | 60101425 A | 6/1985 |
| JP | 4359901 B1 | 11/2009 |

OTHER PUBLICATIONS

Samkov, S.V.;, "Signal processing in UWB radars of small distance," Ultrawideband and Ultrashort Impulse Signals, 2004 Second International Workshop, vol., No., pp. 208-210, Sep. 19-22, 2004.*

Optek Technology, Inc. "OPTEK's Autopad Contactless Sensor Delivers Absolute Position, Angle and Linear Displacement Sensing." [Retrieved on Aug. 11, 2008]. Retrieved from Internet: <URL: http://license.icopyright.net/user/viewFreeUse.act?fuid=MTM4Mjg4MQ%3D%3D>.

German Office Action for German Application No. 10 2009 047 855.8-21 mailed Jan. 21, 2011.

German Office Action for German Application No. 10 2009 052 717.6-21 mailed Feb. 16, 2011.

* cited by examiner

SYSTEM AND METHOD FOR MEASURING A RELATIVE DISTANCE BETWEEN VEHICLE COMPONENTS USING ULTRA-WIDEBAND TECHNIQUES

TECHNICAL FIELD

Embodiments of the subject matter described herein relate generally to onboard vehicle sensor systems. More particularly, embodiments of the subject matter relate to systems and methods for measuring a relative distance between two vehicle components, such as the height between the unsprung vehicle mass and the sprung vehicle mass.

BACKGROUND

Modern automobiles utilize a variety of sensors to detect various operating parameters, conditions, and quantities associated with the operation of the automobiles. For example, a vehicle may utilize onboard sensors and a related control module or processor to measure the height between the sprung and unsprung vehicle mass. Such height measurements can be used in connection with an electronic stability control subsystem, an anti-roll subsystem, a dynamic suspension control subsystem, or the like.

One existing system that measures the height between the sprung and unsprung vehicle mass uses a mechanical linkage assembly that is physically coupled between an unsprung suspension component and a sprung suspension component. The linkage assembly moves with the unsprung suspension component along with the respective wheel. Movement of the linkage assembly influences the reading of a position sensor. Unfortunately, the mechanical linkage assembly is prone to damage, which increases maintenance cost. In addition, the electromechanical linkage is time consuming to install, and its components are relatively expensive.

BRIEF SUMMARY

A first embodiment of a system for measuring relative distance between a first component on a vehicle and a second component on the vehicle is provided. The system includes a wireless ultra-wideband (UWB) transceiver attached to the first component. The wireless UWB transceiver is configured to transmit a UWB measurement pulse toward the second component, and to receive a reflected UWB pulse from a reflective surface of the second component. The reflected UWB pulse represents a reflected version of the UWB measurement pulse. The system also includes a processor coupled to the wireless UWB transceiver. The processor is configured to derive a relative distance between the first component and the second component, based upon characteristics of the UWB measurement pulse and the reflected UWB pulse. The system also has a power generating system for the wireless UWB transceiver. The power generating system is configured to generate operating voltage for the wireless UWB transceiver from kinetic energy associated with motion of the first component relative to the second component.

Also provided is a second embodiment of a system for measuring relative distance between a first component on a vehicle and a second component on the vehicle. This system includes a UWB transceiver coupled to the first component. The UWB transceiver is configured to operate in a measurement mode and a reporting mode. The system also includes a reflector on the second component. The reflector is configured to reflect UWB measurement pulses generated by the UWB transceiver. The system also has a processor coupled to the UWB transceiver. The processor is configured to control operation of the UWB transceiver in the measurement mode and the reporting mode. While operating in the measurement mode, the UWB transceiver transmits a UWB measurement pulse toward the reflector, and receives a reflected UWB pulse from the reflector, where the reflected UWB pulse represents a reflected version of the UWB measurement pulse. Moreover, while operating in the measurement mode, the processor calculates a relative distance between the first component and the second component, based upon characteristics of the UWB measurement pulse and the reflected UWB pulse. While operating in the reporting mode, the UWB transceiver transmits one or more signals that convey information associated with the relative distance.

A method of measuring relative distance between a first component on a vehicle and a second component on the vehicle is also provided. The method involves generating electrical current in response to movement of the first component, and converting the electrical current into a DC operating voltage for a UWB transceiver that is attached to the first component. The method also involves transmitting a UWB measurement pulse from the UWB transceiver, such that the UWB measurement pulse is directed toward a reflective element of the second component. The UWB transceiver receives a reflected UWB pulse from the reflected element. The method continues by determining a distance measurement based upon a propagation time associated with the UWB measurement pulse and the reflected UWB pulse. The distance measurement indicates a distance between the first component and the second component.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
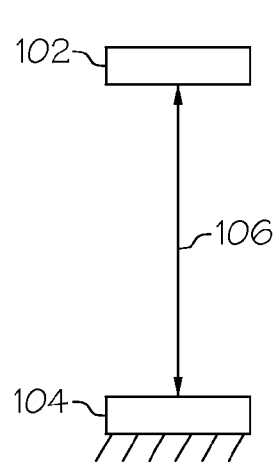
FIGS. 1-3 are diagrams that illustrate relative motion and distance between two components.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. Moreover, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

Certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard," and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The subject matter described herein relates to a self-powered and cost effective system that is capable of performing highly precise and highly reliable measurements of absolute relative position between sprung and unsprung mass of a vehicle, while using an energy harvesting system or device to provide the energy needed to power the measurement system. In certain embodiments, the measurement system employs a high precision ultra-wideband (UWB) device, mounted on sprung and/or unsprung mass of the vehicle, to measure the absolute relative distance between sprung and unsprung mass components. The UWB transceiver transmits a pulse, which reflects off a reflector or a reflective surface, and is subsequently detected and recovered at the UWB transceiver node. The delay time between the transmitted and received pulse is determined, and the absolute relative distance between sprung and unsprung mass is calculated from this delay time.

In certain embodiments, the UWB transceiver is powered by an electromagnetic energy harvesting device that is integrated into a damper assembly of the vehicle. In addition, the UWB transceiver could transmit the measured information wirelessly to a vehicle controller or control module using UWB techniques. In one preferred embodiment, a permanent magnet is mounted on the damper body and a magnetic coil is mounted inside the dust cover of the damper. Current is induced in the coil when the magnet moves (due to movement of the damper body relative to the dust cover). Alternatively, a permanent magnet can be mounted on the inside of the dust cover, and the coil can be mounted around the damper tube. The system may include a rectifier to convert the induced current into DC power that can be used to recharge an energy source for the measurement system. The energy source may, in turn, be used to operate the UWB transceiver.

The measurement system described herein is advantageous because it leverages non-contact position sensing with reduced cost, and increased reliability and accuracy. Moreover, the measurement system is self-powered, transmits the measurement data wirelessly, and eliminates the need for data and power transmission wires to and from the vehicle controller.

Figure 2:
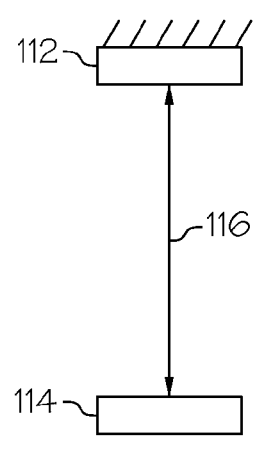
Figure 3:
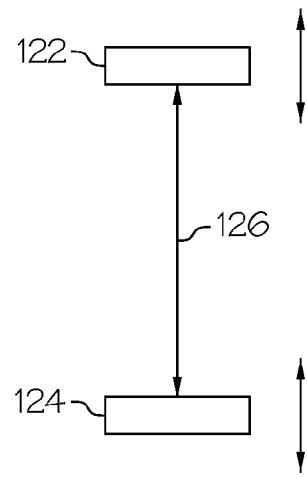

The distance and height measurement systems described here can be suitably configured to measure, detect, or estimate the distance between a first component and a second component, where the two components exhibit movement or motion relative to one another. Although the preferred embodiments relate to the measurement of a distance between two components on a host vehicle, the techniques and technologies described here need not be so limited. In this regard, FIGS. 1-3 are diagrams that illustrate relative motion and distance between two components. FIG. 1 depicts a situation where a first (upper) component 102 can move up and down relative to a second (lower) component 104, which represents or is connected to a stationary reference location. The distance 106 between upper component 102 and lower component 104 is indicated in FIG. 1. Of course, the distance 106 will vary in accordance with the current absolute position of upper component 102.

FIG. 2 depicts a situation where an upper component 112 represents or is connected to a stationary reference location. In FIG. 2, a lower component 114 can move up or down relative to the fixed position of upper component 112. The distance 116 between upper component 112 and lower component 114 at any given moment in time will be defined in accordance with the current absolute position of lower component 114.

FIG. 3 depicts a situation where an upper component 122 is free to move relative to a lower component 124, and vice versa. In other words, upper component 122 and lower component 124 are each able to move independently, and neither is fixed or stationary. For this scenario, the distance 126 between upper component 122 and lower component 124 at a given time will be dictated by both the current absolute position of upper component 122 and the current absolute position of lower component 124.

Figure 4:
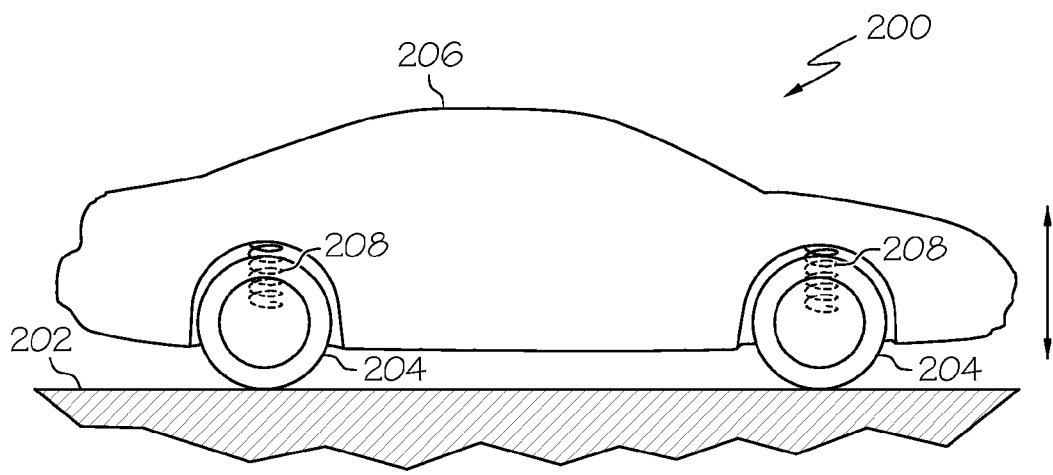
FIG. 4 is a diagram that illustrates relative displacement between sprung and unsprung mass of a vehicle.

As mentioned previously, the measurement systems described herein are suitable for use with onboard vehicle applications. In this regard, FIG. 4 is a diagram that illustrates relative displacement between sprung and unsprung mass of a vehicle 200. As used herein, "unsprung" refers to mass, components, features, or elements of a vehicle that are coupled to the ground 202 or some other reference location in a substantially rigid manner (i.e., coupled to the ground 202 with no dampers, springs, cushions, or the like therebetween). Thus, the tires, brake rotors, axles, and undamped suspension links are typically deployed as unsprung components. In contrast, "sprung" refers to mass, components, features, or elements of a vehicle that are coupled to the ground 202 or some other reference location via one or more spring, damper, cushion, or resilient components. Thus, the passenger cabin, engine, and most body panels are typically deployed as sprung components. The simplified diagram of FIG. 4 assumes that the wheels 204 are unsprung components, and that the body 206 of vehicle 200 is a sprung component. Vehicle 200 may include any number of spring and damper assemblies 208, which couple the sprung mass to the unsprung mass.

FIG. 4 represents a scenario that is similar to that depicted in FIG. 1. In this regard, the sprung mass of vehicle 200 is analogous to first component 102 in that it can move up and down relative to the ground 202 and relative to the unsprung mass of vehicle 200. On the other hand, the ground 202, the wheels 204, and other unsprung mass of vehicle 200 are analogous to second component 104 in FIG. 1. As described above, it is desirable to detect the height between sprung and unsprung components of a vehicle in real-time (or substantially real-time) for purposes of improved ride and handling, vehicle height control, stability control, traction control, and the like.

Figure 5:
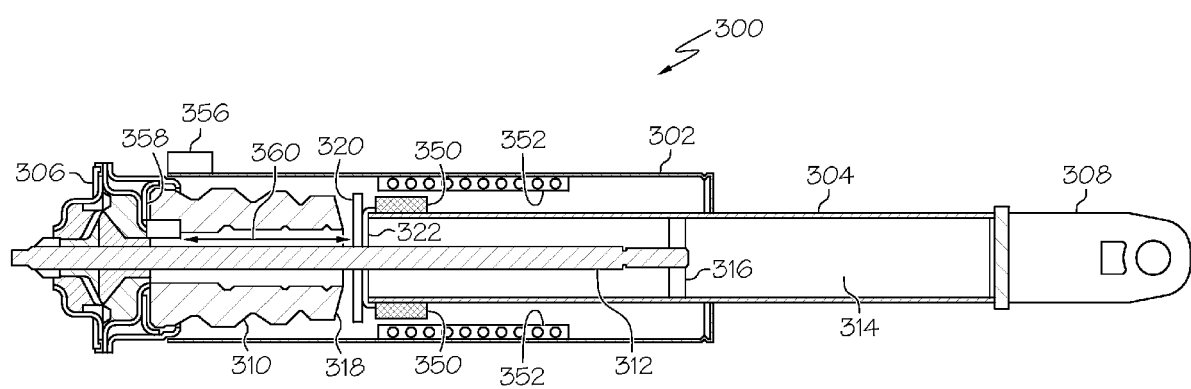
FIG. 5 is a cross sectional view of a first embodiment of a suspension damper assembly that incorporates a system for measuring distance between two components of the damper assembly.

FIG. 5 is a cross sectional view of a first embodiment of a suspension damper assembly 300 that incorporates a system for measuring distance between two components of the damper assembly. FIG. 5 represents a longitudinal sectional view of damper assembly 300. In practice, at least one damper assembly 300 is used for each wheel of the host vehicle. In typical deployments, one damper assembly 300 is located near each corner of the host vehicle, proximate each wheel.

Damper assembly 300 generally includes a first component and a second component coupled to the first component in a way that accommodates relative movement between the two components. One of the two components represents, corresponds to, is attached to, or is connected to a sprung component of the host vehicle, while the other component represents, corresponds to, is attached to, or is connected to an unsprung component of the host vehicle. Although the specific configuration of damper assembly 300 may vary from one implementation to another, this exemplary embodiment generally includes, without limitation: an outer cover 302; a damper tube 304; an upper mounting element 306; a lower mounting element 308; a bumper 310; and a rod 312. These features of damper assembly 300 cooperate with each other in a well-known and conventional manner, and a practical implementation of damper assembly 300 may include additional elements, components, or features that are not depicted in FIG. 5.

Upper mounting element 306 is used to mount damper assembly 300 to one component of the host vehicle, and lower mounting element 308 is used to mount damper assembly 300 to another component of the host vehicle. For this particular example, upper mounting element 306 is designed to be attached to a sprung mass component of the host vehicle (e.g., the frame or a body side rail), and lower mounting element 308 is designed to be attached to an unsprung mass component of the host vehicle (e.g., a lower control arm or a solid axle that, in turn, is attached to a wheel). Accordingly, outer cover 302 and other components that are rigidly attached to, and are stationary with respect to, outer cover 302 may be considered to be a sprung portion of damper assembly 300. Conversely, damper tube 304 and other components that are rigidly attached to, and are stationary with respect to, damper tube 304 may be considered to be an unsprung portion of damper assembly 300.

As understood by those familiar with suspension damper assemblies, damper tube 304 can move back and forth relative to (and at least partially within) outer cover 302. Damper tube 304 includes a damping fluid 314 enclosed therein, and a piston 316 coupled to rod 312. Piston 316 and damping fluid 314 cooperate to inhibit or impede free movement of damper tube 304 relative to outer cover 302, in a known manner. Bumper 310, which is optional, is located in the interior space defined by outer cover 302, mounted toward the upper mounting element 306. Bumper 310 is a resilient element that compresses to further damp the travel of damper tube 304 as it nears the end of its range. The lower end 318 of bumper 310 could engage a stopper plate 320 or, in alternate embodiments, the top end 322 of damper tube 304 itself.

Damper assembly 300 incorporates certain features, elements, and components of a system that measures the relative distance between sprung and unsprung components of damper assembly 300. In this regard, the exemplary embodiment depicted in FIG. 5 includes, without limitation: a magnet 350; a coil 352; a wireless ultra-wideband (UWB) transceiver 354; and an interface module 356. Coil 352 is electrically coupled to interface module 356 using, for example, one or more wires. Interface module 356 is electrically coupled to UWB transceiver 354 using, for example, one or more wires. For the sake of clarity and simplicity, these electrical couplings are not depicted in FIG. 5.

Magnet 350 may be realized as a ring-shaped permanent magnet that is attached to damper tube 304. In this embodiment, magnet 350 wraps around the outside of damper tube 304 at a location that resides within outer cover 302. Notably, magnet 350 is fixed to damper tube 304 such that it moves in concert with damper tube 304. In other words, any translation of damper tube 304 relative to outer cover 302 will result in the same translation of magnet 350. The specific size, shape, electromagnetic characteristics, and longitudinal mounting position of magnet 350 on damper tube 304 may vary from one embodiment to another, as needed to accommodate the operating requirements of the particular application.

Coil 352 may be realized using one or more electrical conductors (e.g., copper wire) that are wound in an appropriate manner. Coil 352 may be packaged as a ring or annular sleeve that is attached to outer cover 302 at a location that accommodates electromagnetic coupling with magnet 350. In this embodiment, coil 352 is positioned around the inner wall of outer cover 302 at location adjacent to magnet 350 and in a manner that provides physical clearance between magnet 350 and coil 352. In preferred embodiments, the longitudinal dimension of coil 352 accommodates the travel range of magnet 350. In other words, the magnetic field generated by magnet 350 should have an influencing effect on coil 352 regardless of the position of damper tube 304 relative to outer cover 302. Notably, coil 352 is fixed to outer cover 302 such that it moves in concert with outer cover 302. In other words, any translation of outer cover 302 relative to damper tube 304 will result in the same translation of coil 352. The specific size, shape, electromagnetic characteristics, and longitudinal mounting position of coil 352 on outer cover 302 may vary from one embodiment to another, as needed to accommodate the operating requirements of the particular application.

Movement of magnet 350 relative to coil 352 induces electrical current in coil 352, in accordance with well known electromagnetic induction principles. Thus, motion of damper tube 304 relative to outer cover 302 will establish current in coil 352. In a vehicle deployment as described here, the current induced in coil 352 may vary in magnitude and frequency, depending upon the operating conditions. For example, if the vehicle is stationary and the suspension is completely passive, then little or no electrical current will be established in coil 352. Conversely, if the vehicle is driving at a high velocity and over a very rough or bumpy road, then electrical current with relatively high magnitude and frequency will be generated.

Coil 352 is electrically coupled to interface module 356 such that any induced electrical current can be provided to interface module 356 for conditioning, processing, handling, etc. Depending upon the embodiment, interface module 356 may be located outside of outer cover 302 (as shown) or inside of outer cover 302. Moreover, preferred embodiments utilize a hermetically sealed package for interface module 356 that is suitable for typical vehicle operating environments. Interface module 356 is suitably configured to convert the induced electrical current into one or more useable DC voltages. The one or more DC voltages may then be used to charge at least one energy storage element and/or be used to power interface module 356 and UWB transceiver 354. An exemplary implementation of interface module 356 is described in more detail below with reference to FIG. 6.

UWB transceiver 354 is electrically coupled to interface module 356 in a manner that accommodates signal and/or data transmission between UWB transceiver 354 and interface module 356. Notably, UWB transceiver 354 is realized as a device or component that is attached, rigidly connected, or fixed to outer cover 302 such that it moves in concert with outer cover 302. In other words, any translation of outer cover 302 relative to damper tube 304 will result in the same translation of UWB transceiver 354. In the illustrated embodiment, the mounting location for UWB transceiver 354 is a cap 358 (which may also serve as a retaining element for bumper 310). Preferred embodiments utilize a hermetically sealed package for UWB transceiver 354 that is suitable for typical vehicle operating environments.

UWB transceiver 354, which preferably operates under the control of interface module 356, is suitably configured to transmit and receive UWB signals as needed to support the distance measuring system. UWB transceivers and technologies are known to those familiar with radio frequency (RF) communication techniques, and UWB technology will not be described in detail here. UWB transceiver 354 preferably includes at least one antenna, a receiver element, a transmitter element, and other RF front end elements that are typically found in RF transceiver devices.

UWB transmissions are characterized by very low power levels that utilize a very large portion of the RF spectrum. The UWB signals generated by UWB transceiver 354 may be considered to be very low power pulses that are very narrow in the time domain, but are very wide in the frequency domain. Typical UWB signals may contain frequency content that is spread within the frequency band of 3.1 GHz to 10.6 GHz. The characteristics of UWB signals make them particularly suitable for onboard vehicle applications that might otherwise introduce high amounts of signal interference, signal reflections, etc. UWB technology can deliver high quality of service in relatively harsh electromagnetic interference environments, e.g., an automobile deployment.

UWB transceiver 354 is suitably configured to transmit UWB measurement pulses toward damper tube 304, and to receive corresponding UWB pulses that have been reflected from a reflective surface associated with damper tube 304. In other words, each UWB measurement pulse propagates from UWB transceiver 354, to the reflective surface, and back to UWB transceiver 354. In this description, a "reflected UWB pulse" represents a reflected version of a corresponding UWB measurement pulse. Thus, a reflected UWB pulse is actually a UWB measurement pulse that has propagated along a certain path, and a reflected UWB pulse received at UWB transceiver 354 is actually a UWB measurement pulse that has returned to UWB transceiver 354.

Notably, the reflective surface of damper is realized on a feature or component that is attached, rigidly connected, or fixed to damper tube 304 such that it moves in concert with damper tube 304. In other words, any translation of damper tube 304 relative to outer cover 302 will result in the same translation of the reflective surface. In the illustrated embodiment, the reflective surface is realized on stopper plate 320 (accordingly, stopper plate 320 may be considered to be a reflector for UWB transceiver 354). Alternatively, the reflective surface could be realized on the top end 322 of damper tube 304. Alternatively, the reflective surface could be realized elsewhere on damper tube 304 or on another component that is rigidly attached to damper tube 304.

The reflective surface has certain characteristics that make it a good reflector of UWB signals and UWB energy. This allows the reflector to efficiently reflect UWB measurement pulses generated by UWB transceiver 354. For example, the reflective surface can be a smooth surface of an electrically conductive material such as metal. Ideally, the reflective surface can effectively and efficiently reflect UWB signals with little loss in energy, thus improving the detection capability of UWB transceiver 354. In this regard, UWB transceiver 354 and the reflective surface are configured, arranged, and located so as to maximize the energy of the reflected signal. In certain embodiments, the reflective surface can be constructed so as to focus the reflected energy toward the UWB transceiver 354.

Operation of damper assembly 300 and its integrated distance measurement system will be further described with reference to FIG. 6, which is a schematic representation of an embodiment of a system 400 for measuring relative distance between two components. This embodiment of system 400 includes a magnet 402, a coil 404, a rectifier/regulator 406, at least one energy source 408, at least one processor 410, and a UWB transceiver 412. These elements of system 400 can be coupled together in an appropriate manner to accommodate the transfer of signals, voltage, current, data, control commands, and the like. System 400 may also include a reflector 414 and a control module 416. In practice, interface module 356 (see FIG. 5) may include or otherwise be associated with rectifier/regulator 406, energy source 408, and processor 410. Indeed, interface module 356 may be realized using any number of distinct circuits, devices, processor elements, electrical components, or the like.

Referring again to FIG. 6, magnet 402, coil 404, UWB transceiver 412, and reflector 414 can be configured and arranged as described above for damper assembly 300, and these elements will not be redundantly described in detail here. The two leads of coil 404 are coupled to rectifier/regulator 406 such that the induced current in coil 404 can be received by rectifier/regulator 406. Rectifier/regulator 406 is suitably configured to convert the induced coil current or voltage (which may be considered to be an AC voltage) into one or more DC voltages, using very well known voltage rectification techniques. In addition, rectifier/regulator 406 regulates the DC voltage or voltages to provide relatively stable and constant DC output. In certain embodiments, rectifier/regulator 406 converts the induced coil current into a DC operating voltage that is used to power UWB transceiver 412. This DC operating voltage can also be used to power processor 410 and/or other electronic components of system 400. The DC voltage generated by rectifier/regulator 406 may be within the range of about 100 mV to about 300 mV, depending upon the needs of system 400. In practice, this voltage range may vary as needed to accommodate the needs of the intended application.

Energy source 408 is preferably realized as a rechargeable energy storage element that can provide DC operating voltage to processor 410, UWB transceiver 412, and/or other electronic components of system 400. In practice, energy source 408 can be recharged with the DC voltage output of rectifier/regulator 406, as depicted in FIG. 6. In other words, energy source 408 is recharged in response to the electrical current induced in coil 404. Although more than one energy source 408 could be deployed, preferred embodiments use one rechargeable energy source 408, which may be realized using a battery, a capacitor, a super-capacitor, or the like.

It should be appreciated that magnet 402, coil 404, and rectifier/regulator 406 cooperate to form one embodiment of a power generating system for certain components of system 400 (e.g., processor 410 and/or UWB transceiver 412). Such a power generating system may also be referred to herein as an energy harvesting system. As explained herein, such a power generating system generates operating voltage from kinetic energy that is associated with motion or movement of a first component (e.g., the component to which magnet 402 is attached) relative to a second component (e.g., the component to which coil 404 is attached). At least some of this kinetic energy is converted into the induced electrical current, which in turn can be converted into the DC operating voltage.

Processor 410 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor may be realized as a microprocessor, a controller, a microcontroller, or a state machine. Moreover, a processor may be implemented as a combination of computing devices, e.g., a combination of a digital signal processor and a microprocessor, a plurality of microprocessors, one or more microprocessors in conjunction with a digital signal processor core, or any other such configuration.

Generally, processor 410 is suitably configured to control the operation of UWB transceiver 412. As described in more detail below, UWB transceiver 412 may be designed for operation in a plurality of different modes, including a measurement mode and a reporting mode. Accordingly, processor 410 can regulate and switch the operating modes, and otherwise control the operation of system 400 as needed to support the different operating modes. As described in more detail below, while operating in the measurement mode, processor 410 derives or calculates the distance between the two monitored components (e.g., the damper and outer cover of a damper assembly), where the distance is based upon certain characteristics of the UWB measurement pulse and the corresponding UWB reflected pulse. Moreover, while operating in the reporting mode, processor 410 controls the transmission of information from UWB transceiver 412 to a receiving element or component, such as control module 416.

The reporting mode of system 400 can be utilized to send measurement data to control module 416, which in turn can receive, interpret, analyze, and initiate an appropriate response. The measurement data is preferably sent with an appropriate identifier or data that uniquely identifies the measured location or component (unique at least within the monitored vehicle environment). For example, if the vehicle has four dampers, then the measurement data transmitted by each of the four UWB transceivers will include a respective identifier, e.g., a Damper ID. Thus, control module 416 preferably includes or cooperates with a UWB receiver or transceiver that is capable of receiving UWB signals or pulses generated by UWB transceiver 412. The UWB receiver will be located within the operating or transmit range of UWB transceiver 412. In practical embodiments, control module 416 may be an onboard electronic controller of the host vehicle, and control module 416 may include additional functionality that is unrelated to the operation of system 400. For example, control module 416 may be associated with an active stability control subsystem, a traction control subsystem, an anti-roll subsystem, a dynamic active suspension subsystem, or other subsystem of the vehicle, where such a subsystem can process and react to the dynamically changing distance/height between the sprung and unsprung mass components of the vehicle.

It should be appreciated that certain operations and functions may be distributed among the various elements of system 400, and that the above description is merely one possible implementation. For example, UWB transceiver 412 may include some processing capability that allows it to convert the raw sensor data (e.g., the pulse propagation time) into a more usable format, such as a distance measurement. As another example, the raw sensor data could be transmitted to control module 416, which in turn may be responsible for converting and/or reformatting the raw sensor data. As yet another example, processor 410 may be suitably configured to perform most of the post-measurement processing on behalf of control module 416, such that useful data can be sent to control module 416, which can react immediately when it receives that useful data.

Figure 6:
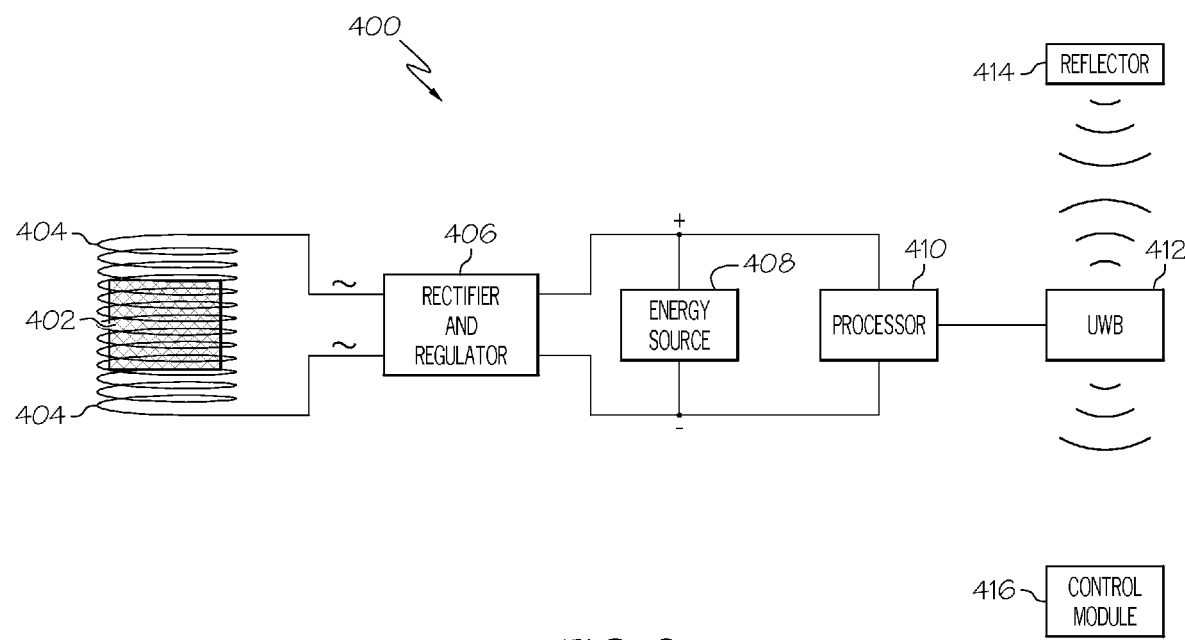
FIG. 6 is a schematic representation of an embodiment of a system for measuring relative distance between two components.

Moreover, the elements depicted in FIG. 6 need not be packaged or arranged as shown. For instance, energy source could be integrated into rectifier/regulator 406. As another example, processor 410 could be integrated into UWB transceiver 354. Indeed, as described below with reference to FIG. 8, many of the elements shown in FIG. 6 could be integrated into a single component.

Operation of damper assembly 300 and system 400 will now be described with reference to FIG. 7 (a flow chart that illustrates a method of generating electrical energy while measuring distance between two components on a vehicle). The various tasks of the distance measurement process 500 depicted in FIG. 7 may be performed by software, hardware, firmware, or any combination thereof. For illustrative purposes, the following description of process 500 may refer to elements mentioned above in connection with FIGS. 1-6. In practice, portions of process 500 may be performed by different elements of the described system, e.g., the coil, the energy source, the processor, or the UWB transceiver. It should be appreciated that process 500 may include any number of additional or alternative tasks, the tasks shown in FIG. 7 need not be performed in the illustrated order, and process 500 may be incorporated into a more comprehensive procedure or process having additional functionality not described in detail herein.

Figure 7:
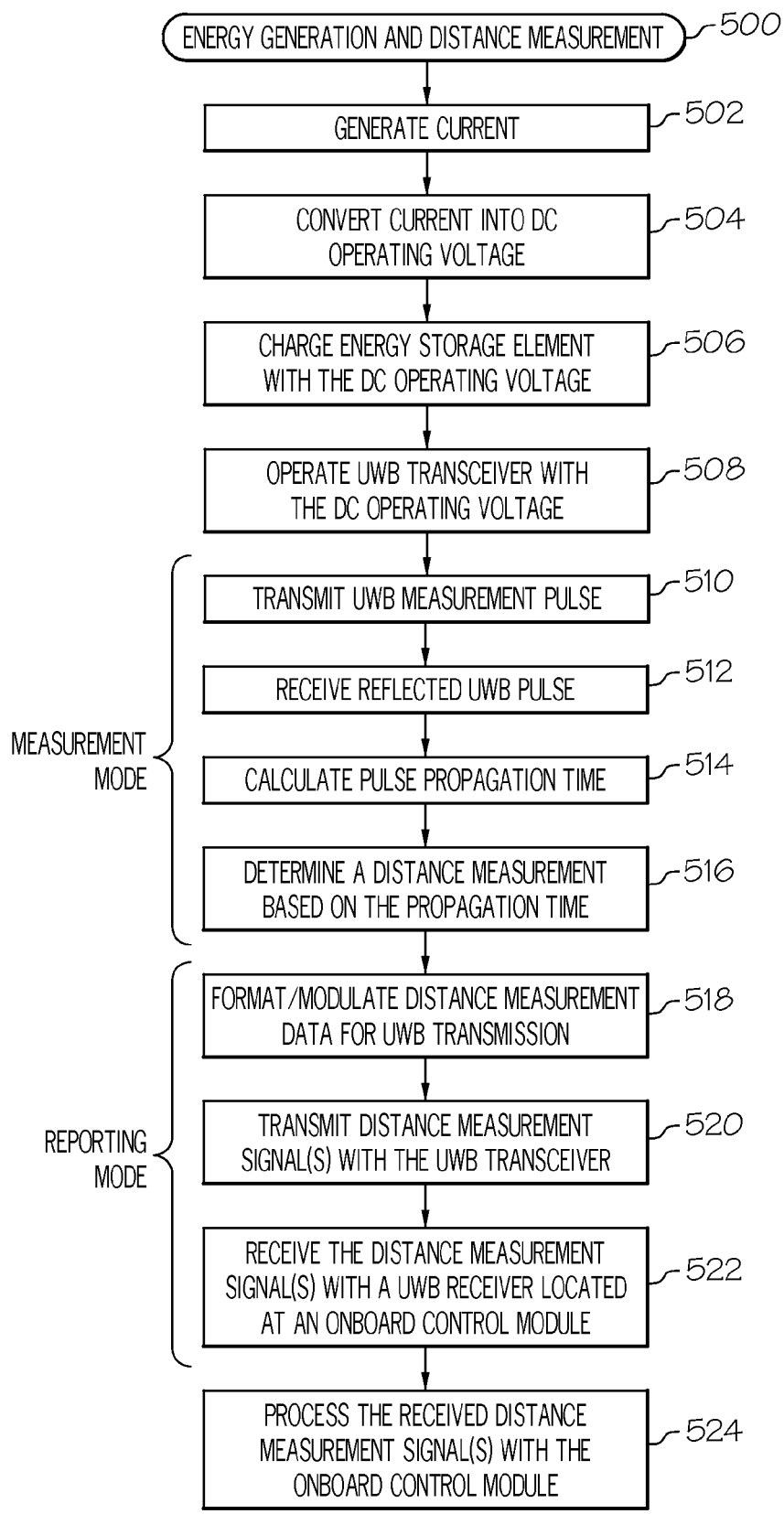
FIG. 7 is a flow chart that illustrates a method of generating electrical power while measuring distance between two components on a vehicle.

FIG. 7 depicts several tasks that are carried out continuously while the vehicle is operating. For example, process 500 generates electrical current in response to the movement of the damper component relative to the outer cover component (task 502). As mentioned above, the electrical current is induced in the coil when the magnet translates relative to the coil, and such electrical current generation may occur at any time and continuously during vehicle operation. The induced electrical current is converted into a DC operating voltage (task 504) that is suitable for the UWB transceiver, and that same DC operating voltage can be used to charge one or more energy storage elements (task 506). Process 500 can operate the UWB transceiver, the processor, and possibly other components with the stored energy and/or with the DC operating voltage itself (task 508). Notably, tasks 502, 504, 506, and 508 represent "background" tasks that can be performed continuously and regardless of the operating mode of the distance measurement system. In practice, tasks 502, 504, 506, and 508 will be performed in parallel with the remaining tasks depicted in FIG. 7.

Process 500 is arranged in accordance with an exemplary embodiment that cycles through at least two different operating modes: a measurement mode and a reporting mode. During the measurement mode, the distance between the two components is measured. Tasks 510, 512, 514, and 516 can be performed during the measurement mode. Thereafter, during the following reporting mode, the previously measured distance is reported or transmitted to a control module (such as the control module 416 shown in FIG. 6). Tasks 518, 520, and 522 can be performed during the reporting mode. In preferred embodiments that utilize a single UWB transceiver, the measurement mode and the reporting mode are sequential in time. In practice, a distance measurement could be taken once every 1.0 to 10.0 ms, depending on the application. Such a high sample rate is desirable to ensure that the distance is monitored and measured in virtually real-time.

While operating in the measurement mode, process 500 transmits a UWB measurement pulse or signal from the UWB transceiver (task 510). The UWB measurement pulse is directed toward the reflective element, which then reflects the UWB measurement pulse back to the UWB transceiver (in the form of a reflected UWB pulse). The UWB transceiver receives the reflected UWB pulse (task 512) from the reflective element. Thereafter, process 500 may calculate the pulse propagation time (task 514) associated with the UWB measurement pulse and the reflected UWB pulse. As used here, the pulse propagation time is derived from the transmit time of the UWB measurement pulse and the receipt time of the reflected UWB pulse. In preferred embodiments, the pulse propagation time is simply calculated as the difference between the receipt time and the transmit time.

As is well understood, the pulse propagation time will be dependent upon the current distance between the UWB transceiver and the reflective surface. Consequently, the pulse propagation time will be indicative of the distance between the two monitored components of interest (e.g., the damper and the outer cover). Accordingly, process 500 may continue by calculating, deriving, or otherwise determining a distance measurement, such as the relative distance between the two components (task 516). Again, this distance measurement will be based upon or otherwise influenced by the pulse propagation time. It should be appreciated that the distance measurement may be expressed in any convenient scale, and that the distance measurement may indicate the distance between any two reference points associated with the monitored system. For example, the distance measurement may indicate the actual real-world distance between the UWB transceiver and the reflective surface. Alternatively, the distance measurement may indicate the actual real-world distance between a first reference location on the damper component and a second reference location on the outer cover. In other words, the distance measurement may represent a translated, offset, transformed, or scaled distance that is merely based upon the pulse propagation time. The distance measurement need not be strictly linked to the two features or surfaces used to obtain the pulse propagation time. Moreover, the distance measurement can be expressed using any arbitrary and convenient scale that is appropriate for the intended application. In general, the system can implement an algorithm that converts time of flight of the UWB signal into a number or expression that represents the derived separation distance (d) as a function of the time difference: $d=f(\Delta t)$.

After the processor determines the distance measurement, process 500 may enter the reporting mode. While operating in the reporting mode, the distance measurement can be formatted, configured, packaged, modulated, or otherwise prepared for UWB transmission (task 518). An example could involve a packet data based transmission scheme where the header associated with the packet data indicates the vehicle damper location and/or a unique node identification, along with derived measured data. The packet data could also contain various data transmission error detection and correction schemes that are well known to those skilled in the art. It should be appreciated that process 500 could leverage a number of well known wireless data communication techniques and modulation technologies during task 518. Once the distance measurement information is ready for transmission, the UWB transceiver can transmit one or more distance measurement signals or pulses that convey information or data that is associated with the distance measurement (task 520).

FIG. 7 assumes that the distance measurement signals or pulses transmitted during task 520 are successfully received with a UWB receiver of an onboard control module (task 522). Once received, the distance measurement signals or pulses can be processed with the onboard control module in an appropriate manner and as needed (task 524). For example, the control module might demodulate, extract or otherwise obtain the distance measurement and apply that distance measurement in accordance with whatever control scheme or data processing scheme is required by the particular vehicle system. The post-reception processing carried out during task 524 need not be performed during the reporting mode. Rather, task 524 could be executed during subsequent distance measurement and/or subsequent reporting cycles.

Figure 8:
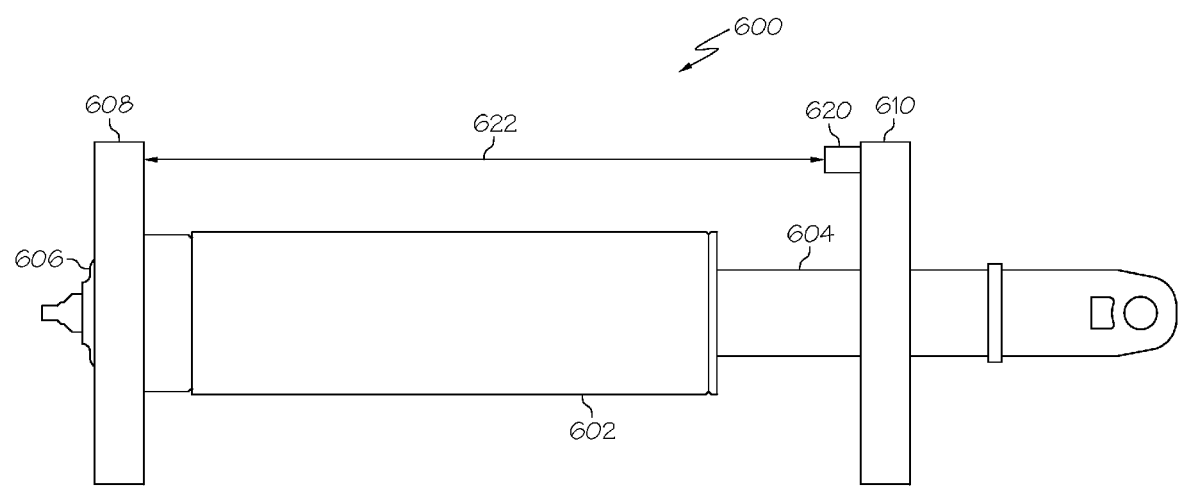
FIG. 8 is a cross sectional view of a second embodiment of a suspension damper assembly that incorporates a system for measuring distance between two components of the damper assembly.

Referring again to FIG. 5, damper assembly 300 utilizes magnet 350 and coil 352 to generate electrical current in a self-powering manner. Alternatively, the power generating system could employ an electromagnetic energy harvester that is attached to one of the moving components (or two harvesters, each attached to a respective one of the two moving components). In this regard, FIG. 8 is a cross sectional view of a second embodiment of a suspension damper assembly 600 that incorporates a system for measuring distance between two of its components. Damper assembly 600 is similar to damper assembly 300 in many respects, and common features and characteristics will not be redundantly described here.

Damper assembly 600 includes an outer cover 602, a damper 604, an upper mounting element 606, an upper structural element 608 coupled to upper mounting element 606 and/or to outer cover 602, and a lower structural element 610 coupled to damper 604. In some embodiments, upper structural element 608 is configured to function as an upper spring seat for damper assembly 600, and lower structural element 610 is configured to function as a lower spring seat for damper assembly 600. The spring seats cooperate with a coil spring or air spring (not shown) that surrounds damper 604 and outer cover 602. The spring seats maintain the coil spring in place and the lower spring seat moves in concert with damper 604.

Damper assembly 600 preferably includes a distance measurement module 620 that is connected to lower structural element 610. Notably, distance measurement module 620 is fixed to damper 604 such that it moves in concert with damper

604. In other words, any translation of damper 604 relative to outer cover 602 will result in the same translation of distance measurement module 620.

Distance measurement module 620 may be realized using any number of distinct circuits, devices, processor elements, electrical components, or the like. In practice, distance measurement module 620 may include or otherwise be associated with an electromagnetic energy harvester, a rectifier/regulator, at least one energy source, a processor, and a UWB transceiver. As used here, an electromagnetic energy harvester is a device or a small self-contained unit that is suitably configured to produce electrical current in response to shaking, vibration, movement, or motion thereof. In practice, an electromagnetic energy harvester may include a spring-mounted permanent magnet that is surrounded by an electrically conductive coil. When the energy harvester is shaken or vibrated, the magnet moves relative to the coil, thus inducing electrical current in the coil. Accordingly, the energy harvester functions in a manner similar to that described above for damper assembly 300 and system 400. Indeed, distance measurement module 620 represents a self-contained package that incorporates all of the elements depicted in FIG. 6 (excluding reflector 414 and control module 416).

Referring again to FIG. 8, distance measurement module 620 is positioned such that it can transmit UWB measurement pulses toward upper structural element 608. Notably, upper structural element 608 serves as a reflector for the UWB measurement pulses. Distance measurement module 620 and upper structural element 608 are preferably arranged and configured such that a path 622 can be established between distance measurement module 620 and upper structural element 608. The operation of damper assembly 600 and its integrated distance measuring system are similar to that described above for damper assembly 600 and system 400.

Figure 9:
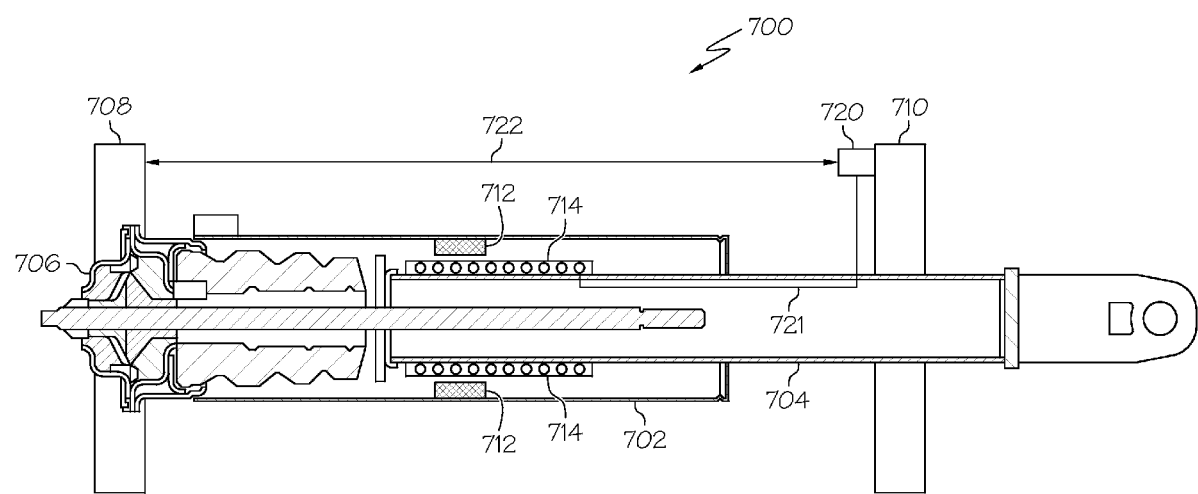
FIG. 9 is a cross sectional view of a third embodiment of a suspension damper assembly that incorporates a system for measuring distance between two components of the damper assembly.

FIG. 9 is a cross sectional view of a third embodiment of a suspension damper assembly 700 that incorporates a system for measuring distance between two of its components. Damper assembly 700 is similar to damper assembly 300 in some respects, and similar to damper assembly 600 in some respects. For the sake of brevity, common features and characteristics will not be redundantly described here.

Damper assembly 700 includes an outer cover 702, a damper 704, an upper mounting element 706, an upper structural element 708 coupled to upper mounting element 706 and/or to outer cover 702, and a lower structural element 710 coupled to damper 704. Damper assembly 700 also includes a magnet 712 attached to outer cover 702, and a coil 714 attached to damper 704. Note that the locations of magnet 712 and coil 714 are opposite to that utilized by damper assembly 300.

Damper assembly 700 preferably includes a distance measurement module 720 that is connected to lower structural element 710. Notably, distance measurement module 720 is fixed to damper 704 such that it moves in concert with damper 704. Distance measurement module 720 can be electrically coupled to coil 714 using one or more wires 721 or conduits. Distance measurement module 720 may be realized using any number of distinct circuits, devices, processor elements, electrical components, or the like. In practice, distance measurement module 720 may include or otherwise be associated with a rectifier/regulator, at least one energy source, a processor, and a UWB transceiver. In certain embodiments, distance measurement module 720 represents a self-contained package that incorporates these elements.

Distance measurement module 720 is positioned such that it can transmit UWB measurement pulses toward upper structural element 708. Notably, upper structural element 708 serves as a reflector for the UWB measurement pulses. Distance measurement module 720 and upper structural element 708 are preferably arranged and configured such that a propagation path 722 can be established between distance measurement module 720 and upper structural element 708. The operation of damper assembly 700 and its integrated distance measuring system are similar to that described above for damper assembly 600 and system 400.

Figure 10:
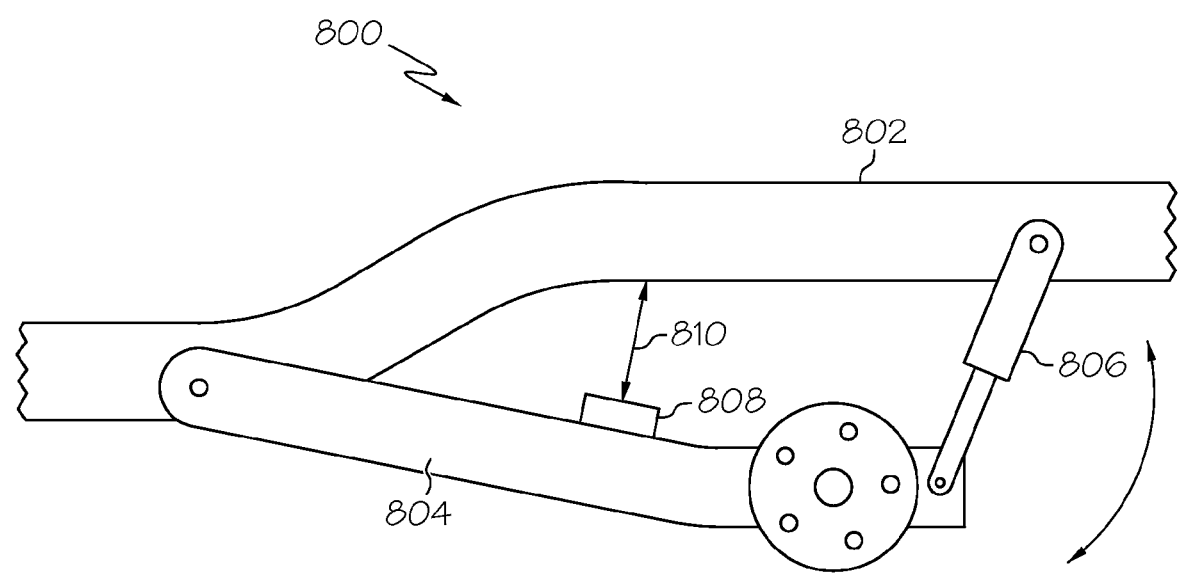
FIG. 10 is a side view of a portion of a vehicle suspension assembly that incorporates a system for measuring distance between two of its components.

FIGS. 5, 8, and 9 illustrate preferred deployments that involve damper assemblies. However, a distance measuring system as described herein could be incorporated into other assemblies for use with different applications. For example, FIG. 10 is a side view of a portion of a vehicle suspension assembly 800 that incorporates a system for measuring distance between two of its components. In particular, suspension assembly 800 includes a frame or body side rail 802, a suspension link or component 804, a damper assembly 806, and a distance measuring module 808. Frame or body side rail 802 is considered to be a sprung mass component, and suspension link or component 804 is considered to be an unsprung mass component.

During vehicle operation, the distance between frame or body side rail 802 and suspension link or component 804 will vary. Distance measuring module 808 can be used to measure the instantaneous height 810 between frame or body side rail 802 and suspension link or component 804, using the techniques and technologies described in more detail above. In this regard, distance measuring module 808 is preferably configured as described above for distance measurement module 620, which includes an energy harvester device (see FIG. 8).

In alternate embodiments, a suitably arranged distance measuring system could be deployed to measure a distance, height, length, width, depth, or any specified dimension associated with various onboard vehicle systems, components, or devices. For example, embodiments of a distance measuring system could be modified for use with one or more of the following applications: a lifting gate strut assembly; a hood lift mechanism; a convertible top assembly; a sunroof, a passenger door; a pedal mechanism; or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for measuring relative distance between a first component on a vehicle and a second component on the vehicle, the system comprising:

a wireless ultra-wideband (UWB) transceiver attached to the first component, the wireless UWB transceiver being configured to transmit a UWB measurement pulse toward the second component, and to receive a reflected UWB pulse from a reflective surface of the second component, wherein the reflected UWB pulse represents a reflected version of the UWB measurement pulse;

a processor coupled to the wireless UWB transceiver, the processor being configured to derive a relative distance between the first component and the second component, based upon characteristics of the UWB measurement pulse and the reflected UWB pulse; and a power generating system for the wireless UWB transceiver, the power generating system being configured to generate operating voltage for the wireless UWB transceiver from kinetic energy associated with motion of the first component relative to the second component.

2. The system of claim 1, the processor being configured to derive the relative distance based upon a propagation time associated with the UWB measurement pulse and the reflected UWB pulse.

3. The system of claim 1, the power generating system comprising:
a magnet attached to the first component such that the magnet moves in concert with the first component; and
a coil attached to the second component such that the coil moves in concert with the second component; wherein
motion of the first component relative to the second component establishes electrical current in the coil.

4. The system of claim 1, the power generating system comprising:
a magnet attached to the second component such that the magnet moves in concert with the second component; and
a coil attached to the first component such that the coil moves in concert with the first component; wherein
motion of the first component relative to the second component establishes electrical current in the coil.

5. The system of claim 1, the power generating system comprising an electromagnetic energy harvester attached to the first component, the electromagnetic energy harvester being configured to produce electrical current in response to motion of the first component.

6. The system of claim 1, the power generating system comprising an electromagnetic energy harvester attached to the second component, the electromagnetic energy harvester being configured to produce electrical current in response to motion of the second component.

7. The system of claim 1, wherein:
the first component is an unsprung component of the vehicle; and
the second component is a sprung component of the vehicle.

8. The system of claim 1, wherein:
the first component is a sprung component of the vehicle; and
the second component is an unsprung component of the vehicle.

9. The system of claim 1, wherein:
the first component is an unsprung portion of a suspension damper assembly of the vehicle; and
the second component is a sprung portion of the suspension damper assembly.

10. The system of claim 1, wherein:
the first component is a sprung portion of a suspension damper assembly of the vehicle; and
the second component is an unsprung portion of the suspension damper assembly.

11. A system for measuring relative distance between a first component on a vehicle and a second component on the vehicle, the system comprising:
an ultra-wideband (UWB) transceiver coupled to the first component, the UWB transceiver being configured to operate in a measurement mode and a reporting mode;

a reflector on the second component, the reflector being configured to reflect UWB measurement pulses generated by the UWB transceiver; and a processor coupled to the UWB transceiver, the processor being configured to control operation of the UWB transceiver in the measurement mode and the reporting mode; wherein while operating in the measurement mode, the UWB transceiver transmits a UWB measurement pulse toward the reflector, and receives a reflected UWB pulse from the reflector, the reflected UWB pulse representing a reflected version of the UWB measurement pulse;

while operating in the measurement mode, the processor calculates a relative distance between the first component and the second component, based upon characteristics of the UWB measurement pulse and the reflected UWB pulse; and while operating in the reporting mode, the UWB transceiver transmits one or more signals that convey information associated with the relative distance.

12. The system of claim 11, further comprising a control module comprising a UWB receiver located within range of the UWB transceiver, the UWB receiver being configured to receive the one or more signals transmitted by the UWB transceiver during the reporting mode.

13. The system of claim 11, further comprising a power generating system for the UWB transceiver and the processor, the power generating system being configured to generate voltage in response to movement of the first component and/or the second component.

14. The system of claim 13, wherein the power generating system comprises:
a magnet attached to one of the first component or the second component; and
a coil attached to the other one of the first component or the second component; wherein
movement of the first component relative to the second component induces electrical current in the coil.

15. The system of claim 14, further comprising a rechargeable energy source coupled to the coil, wherein the rechargeable energy source is configured to provide operating power for the processor and the UWB transceiver, and wherein the rechargeable energy source is recharged in response to the electrical current induced in the coil.

16. A method of measuring relative distance between a first component on a vehicle and a second component on the vehicle, the method comprising:
generating electrical current in response to movement of the first component;
converting the electrical current into a DC operating voltage for an ultra-wideband (UWB) transceiver that is attached to the first component;
transmitting a UWB measurement pulse from the UWB transceiver, the UWB measurement pulse being directed toward a reflective element of the second component;
the UWB transceiver receiving, in response to the UWB measurement pulse, a reflected UWB pulse from the reflected element; and
determining a distance measurement based upon a propagation time associated with the UWB measurement pulse and the reflected UWB pulse, the distance measurement indicating distance between the first component and the second component.

17. The method of claim 16, further comprising the step of charging an energy storage element with the DC operating voltage.

18. The method of claim 16, further comprising the step of transmitting, with the UWB transceiver, one or more signals that convey information associated with the distance measurement.

19. The method of claim 16, further comprising the step of receiving the one or more signals, using a UWB receiver of a control module onboard the vehicle.

20. The method of claim 16, wherein:
one of the first component or the second component includes a magnet attached thereto;
the other one of the first component or the second component includes a coil attached thereto; and
generating electrical current comprises inducing the electrical current in the coil with the magnet, in response to movement of the magnet relative to the coil.

* * * * *